(12) United States Patent
Kawada et al.

(10) Patent No.: US 12,712,180 B2
(45) Date of Patent: Aug. 18, 2026

(54) POSITIVE ELECTRODE MATERIAL AND SECONDARY BATTERY

(71) Applicant: Panasonic Intellectual Property Management Co., Ltd., Osaka (JP)

(72) Inventors: Hiroshi Kawada, Hyogo (JP); Kosuke Kuroda, Kyoto (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 846 days.

(21) Appl. No.: 17/262,482

(22) PCT Filed: Feb. 21, 2019

(86) PCT No.: PCT/JP2019/006651
§ 371 (c)(1),
(2) Date: Jan. 22, 2021

(87) PCT Pub. No.: WO2020/026486
PCT Pub. Date: Feb. 6, 2020

(65) Prior Publication Data
US 2021/0288320 A1 Sep. 16, 2021

(30) Foreign Application Priority Data
Jul. 31, 2018 (JP) ................................ 2018-144195

(51) Int. Cl.
*H01M 10/0525* (2010.01)
*C01G 49/00* (2006.01)
(Continued)

(52) U.S. Cl.
CPC ........ *H01M 4/505* (2013.01); *C01G 49/0027* (2013.01); *C01G 53/42* (2013.01);
(Continued)

(58) Field of Classification Search
None
See application file for complete search history.

(56) References Cited

U.S. PATENT DOCUMENTS 5,817,436 A 10/1998 Nishijima et al.
6,200,703 B1 3/2001 Kashio et al.
(Continued)

FOREIGN PATENT DOCUMENTS

CN 101981730 A 2/2011
CN 102569878 A 7/2012
(Continued)

OTHER PUBLICATIONS

International Search Report dated May 21, 2019, issued in counterpart International Application No. PCT/JP2019/006651 (1 page).
(Continued)

*Primary Examiner* — Yoshitoshi Takeuchi
(74) *Attorney, Agent, or Firm* — WHDA, LLP

(57) ABSTRACT

A positive electrode material for secondary batteries, the material including a Li-rich transition metal oxide having a lithium-to-oxygen atomic ratio: Li/O of 0.8 or more, and a dicarboxylic acid and/or an anhydride of the dicarboxylic acid.

19 Claims, 1 Drawing Sheet

(51) Int. Cl.

| | |
|---|---|
| ***C01G 53/42*** | (2025.01) |
| ***H01M 4/134*** | (2010.01) |
| ***H01M 4/485*** | (2010.01) |
| ***H01M 4/505*** | (2010.01) |
| ***H01M 4/52*** | (2010.01) |
| ***H01M 4/525*** | (2010.01) |
| *H01M 4/02* | (2006.01) |

(52) U.S. Cl.

CPC ........... *H01M 4/134* (2013.01); *H01M 4/525* (2013.01); *H01M 10/0525* (2013.01); *H01M 2004/027* (2013.01); *H01M 2004/028* (2013.01)

(56) References Cited

U.S. PATENT DOCUMENTS

2004/0200998 A1* 10/2004 Park ........................ C01G 53/42 252/500
2009/0194747 A1* 8/2009 Zou ..................... H01M 4/0404 252/521.5
2011/0318631 A1* 12/2011 Nomura ................. H01G 11/32 429/144
2012/0021282 A1* 1/2012 Katou ..................... H01M 4/62 429/211
2012/0164533 A1* 6/2012 Senoue ................. H01M 4/525 429/219
2015/0270533 A1* 9/2015 Takanashi ............. H01M 4/131 429/231
2015/0340692 A1 11/2015 Park et al.
2016/0351905 A1* 12/2016 Kawamura ....... H01M 10/0525
2018/0034102 A1* 2/2018 Sakaguchi .......... H01M 10/052
2018/0226635 A1 8/2018 Yuan
2019/0051891 A1 2/2019 Matsuu et al.

FOREIGN PATENT DOCUMENTS

| | | | |
|---|---|---|---|
| JP | 9-180725 | A | 7/1997 |
| JP | 9-241026 | A | 9/1997 |
| JP | 2005-011594 | A | 1/2005 |
| JP | 2006-236887 | A | 9/2006 |
| JP | 2011-258333 | A | 12/2011 |
| JP | 2012-048917 | A | 3/2012 |
| JP | 2012-142156 | A | 7/2012 |
| JP | 2015-11594 | A | 1/2015 |
| JP | 2015-536541 | A | 3/2015 |
| JP | 2015-122234 | A | 7/2015 |
| JP | 2015-153599 | A | 8/2015 |
| WO | 2009097680 | A1 | 8/2009 |
| WO | 2012/165212 | A1 | 12/2012 |
| WO | 2015/115052 | A1 | 8/2015 |
| WO | 2017/158961 | A1 | 9/2017 |

OTHER PUBLICATIONS

English Translation of Chinese Search Report dated Jan. 18, 2024 for the related Chinese Patent Application No. 201980042692.7. (3 pages).

* cited by examiner

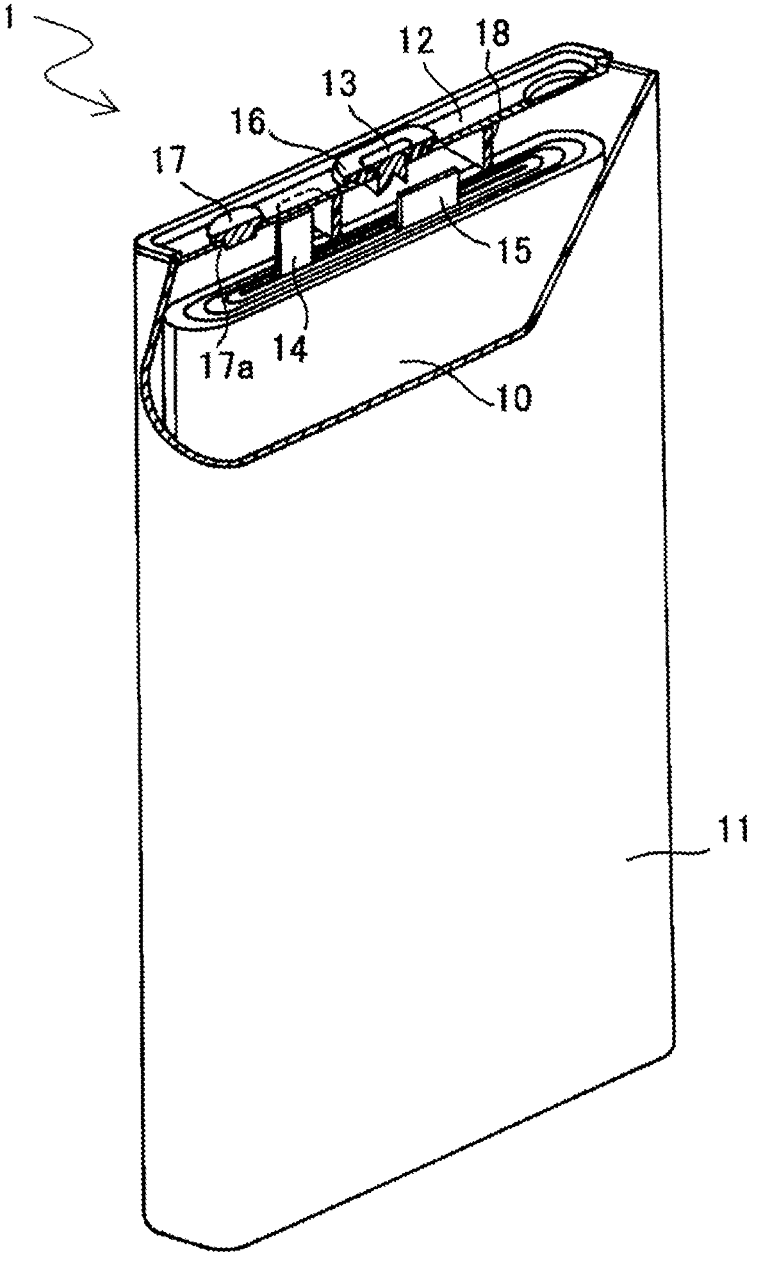
1
12
18
13
16
17
15
17a
14
10
11

POSITIVE ELECTRODE MATERIAL AND SECONDARY BATTERY

TECHNICAL FIELD

The present disclosure relates to a positive electrode material for secondary batteries, and a secondary battery.

BACKGROUND ART

To achieve a higher capacity of lithium ion batteries, some attempts have been made to use a Li-rich transition metal oxide in which the ratio of lithium to oxygen is high.

For example, Patent Literature 1 discloses using $Li_2NiO_2$ as a positive electrode active material having a high theoretical capacity.

Patent Literature 2 discloses an example of a lithium secondary battery using a mixture of $Li_2NiO_2$ and a lithium-containing transition metal oxide $LiNi_{0.8}Co_{0.15}Al_{0.05}O_2$ mixed in a ratio of 5:95 as a positive electrode active material.

CITATION LIST

Patent Literature

[PTL 1] Japanese Laid-Open Patent Publication No. H9-241026

[PTL 2] Japanese Laid-Open Patent Publication No. 2015-536541

SUMMARY OF INVENTION

Technical Problem

The Li-rich transition metal oxide, however, due to its high surface reactivity, tends to accelerate a side reaction accompanied by the decomposition of electrolyte and thus, tends to result in a low initial efficiency of the secondary battery.

Solution to Problem

One aspect of the present invention relates to a positive electrode material for secondary batteries, the positive electrode material including: a Li-rich transition metal oxide having a lithium-to-oxygen atomic ratio: Li/O of 0.8 or more; and a dicarboxylic acid and/or an anhydride of the dicarboxylic acid.

Another aspect of the present invention relates to a secondary battery including: a positive electrode including the positive electrode material of the above one aspect, a negative electrode, and an electrolyte.

Advantageous Effects of Invention

According to the positive electrode material of the present disclosure, the side reaction of the secondary battery can be suppressed, and the initial efficiency thereof can be improved.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

[FIG. 1] A partially cut-away oblique view of the secondary battery according to one embodiment of the present disclosure.

DESCRIPTION OF EMBODIMENTS

A positive electrode material according to an embodiment of the present disclosure includes a Li-rich transition metal oxide having a lithium-to-oxygen atomic ratio: Li/O of 0.8 or more, and a dicarboxylic acid and/or an anhydride of the dicarboxylic acid (hereinafter sometimes referred to as "dicarboxylic acid/anhydride").

In the present disclosure, the positive electrode material refers to a concept that encompasses raw materials used for formation of a positive electrode (e.g., a positive electrode active material powder), intermediate products (e.g., a positive electrode material mixture including the positive electrode active material, a slurry of a positive electrode material mixture dispersed in a liquid dispersion medium), a positive electrode material layer included in a completed positive electrode, and materials taken out from the completed positive electrode, such as the positive electrode active material and the positive electrode material mixture.

The dicarboxylic acid/anhydride can form a favorable coating on a surface of the Li-rich transition metal oxide. In other words, at least part of the surface of the positive electrode material can be covered with a coating derived from the dicarboxylic acid/anhydride. The coating serves to suppress the decomposition of electrolyte and the gas generation that may occur at the surface of the Li-rich transition metal oxide, leading to an improved initial efficiency: The coating derived from the dicarboxylic acid/anhydride is usually formed as a result of capturing lithium ions and, therefore, contains lithium, oxygen, and carbon.

Examples of the transition metal element contained in the Li-rich transition metal oxide include Sc, Ti, V, Cr, Mn, Fe, Co, Ni, Cu, Y, Zr, and W. The lithium-containing transition metal oxide may include one kind or two or more kinds of transition metal elements. The Li-rich transition metal oxide may contain, for example, at least one selected from the group consisting of Ni, Co, Mn, Cu, and Fe. Preferably, at least one of Ni and Fe is contained. The Li-rich transition metal oxide may contain, if necessary, one kind or two or more kinds of typical metal elements. Examples of the typical metal element include Mg, Al, Ca, Zn, Ga, Ge, Sn, Sb, Pb, and Bi.

When the Li-rich transition metal oxide contains Ni and/or Fe, the ratio of the total of Ni and/or Fe to the total of the transition metal element(s) and the typical metal element(s) may be 50 atom % or more, and may be 80 atom % or more.

One example of the Li-rich transition metal oxide is a composite oxide of lithium and a metal element $M^1$ represented by $Li_{x1}M^1A^1_2$, where $1.5 \leq x1 \leq 2.3$ (hereinafter, as appropriate, "first composite oxide"). M' includes at least one selected from the group consisting of Ni, Co, Mn, Cu, and Fe, $A^1$ includes at least oxygen. $A^1$ has an oxygen content of 85 atom % or more. The first composite oxide belongs to the space group Immm.

The first composite oxide may contain, for example, Ni. In the first composite oxide, the content of Ni in M' may be 50 atom % or more, and may be 80 atom % or more.

A typical specific example of the first composite oxide is $Li_2NiO_2$, $Li_2NiO_2$ has a crystal structure belonging to the space group Immm. In $Li_2NiO_2$, Ni is planarly coordinated with four surrounding oxygen atoms, forming a cluster of $NiO_4$ having a planar tetracoordinate structure. Adjacent $NiO_4$ clusters are linked so as to share two O atoms on the same plane, forming a planar one-dimensional straight chain having a $NiO_2$ composition. The straight chains of $NiO_2$ are stacked such that their planes become parallel one another, forming a layered structure. Li is present between the $NiO_2$ one-dimensional straight chains stacked in the layered structure. Specifically, Li is coordinated with, two oxygen atoms at the side end of the $NiO_2$ one-dimensional straight chain, and each one of the oxygen atoms of the $NiO_2$ one-dimensional straight chains in the upper and lower layers, and thus tetracoordinated with O atoms.

In $Li_2NiO_2$, Ni is present as a bivalent cation. When lithium ions are released from $Li_2NiO_2$ during charging. Ni can change to a trivalent or tetravalent cation. However, with the change in the valence of Ni, it becomes difficult to maintain the above planar structure of the $NiO_4$. Therefore, $Li_2NiO_2$ is known as prone to change into a crystal structure incapable of absorbing Li ions and having a large irreversible capacity.

To suppress the change in crystal structure associated with the release of Li, the element $M^1$ in the first composite oxide may be partially replaced with one or more other metal elements, and/or some of the oxygen atoms may be replaced with one or more other elements. For example, the first composite oxide may be $Li_{x1}M^{1A}{}_{1-x2}M^{1B}{}_{x2}O_{2-y}A^2{}_y$, where $0 \leq x2 \leq 0.5$, $0 \leq y \leq 0.3$, and at least one of x2 and y is not zero. $M^{1A}$ is a main metal element constituting the lithium composite oxide, and is at least one selected from the group consisting of Ni, Co, Mn, Cu, and Fe. $M^{1B}$ is a metal element substituted for $M^1$ and includes at least one selected from the group consisting of Al, Mg, Sc, Ti, Cr, V, Zn, Ga, Zr, Mo, Nb, Ta, and W. The element $A^2$ substituted for oxygen includes at least one selected from the group consisting of F, Cl, Br, S, and P.

Another example of the Li-rich transition metal oxide is a composite oxide of lithium and a metal element $M^2$ represented by $Li_{x3}M^2O_z$, where $4 \leq x3 \leq 7$ and $3.5 \leq z \leq 5$ (hereinafter, as appropriate, "second composite oxide"). $M^2$ includes at least one selected from the group consisting of Ni, Co, Mn, Cu, and Fe. The second composite oxide belongs to the space group Pbca.

The second composite oxide may contain, for example, Fe. In the second composite oxide, the content of Fe in $M^2$ may be 50 atom % or more, and 80 atom % or more.

A typical specific example of the second composite oxide is $Li_5FeO_4$. $Li_5FeO_4$ has a crystal structure belonging to the space group Pbca. $Li_5FeO_4$ has a structure in which Li or Fe sits in a cation site of $Li_2O$ having an anti-fluorite type structure. On the other hand, the cation site is partially vacant and capable of absorbing many lithium ions via the vacancies.

The dicarboxylic acid/anhydride is added to the positive electrode material before assembling into a secondary battery, rather than adding to the electrolyte. By adding the dicarboxylic acid/anhydride beforehand to the positive electrode material, a favorable coating is formed on the surface of the Li-rich transition metal oxide.

The dicarboxylic acid/anhydride included in the positive electrode material, in the battery, may dissolve partially into the electrolyte; however, the dicarboxylic acid/anhydride included in the positive electrode material can be detected, by analyzing the positive electrode material taken out from the battery.

Note that merely by adding the dicarboxylic acid/anhydride to the electrolyte, it is difficult to form a coating on the surface of the Li-rich transition metal oxide.

In the fabrication of the secondary battery, the positive electrode can be produced typically by applying a positive electrode slurry including a positive electrode mixture and a liquid dispersion medium onto a surface of a positive electrode current collector, and drying the slurry. The positive electrode mixture essentially contains positive electrode active material particles and a binder. Since the Li-rich transition metal oxide has a strong alkalinity, a binder component (e.g., polyvinylidene fluoride (PVdF)) in the positive electrode slurry reacts to generate hydrogen fluoride (HF).

To address this, by containing the dicarboxylic acid/anhydride in the positive electrode slurry, the strong alkalinity of the positive electrode slurry is neutralized, and the generation of hydrogen fluoride can be suppressed. As a result, the manufacturing process can be stabilized, and a high-quality positive electrode can be easily obtained.

The dicarboxylic acid/anhydride is, as described above, for forming a coating on the surface of the Li-rich transition metal oxide serving as the positive electrode active material, and therefore, preferably remain present in the positive electrode material. Therefore, the dicarboxylic acid/anhydride is preferably solid at room temperature and less soluble to the electrolyte.

The electrolyte includes a high-polarity solvent. In view of suppressing the solubility to the electrolyte low, the dicarboxylic acid/anhydride preferably has no polar group, such as a halogen group, a hydroxy group, and an amino group, except the carboxyl group. Furthermore, the larger the number of carbon atoms in the hydrocarbon chain to be bonded to the carbonyl carbon is, the weaker the polarity of the dicarboxylic acid becomes, and the lower the solubility to the electrolyte tends to be. On the other hand, in view of forming a coating on the positive electrode active material as dense as possible, carbon atoms are present preferably in a smaller number in the hydrocarbon chain to be bonded to the carbonyl carbon.

Of the dicarboxylic acid/anhydride, the anhydride is likely to form a dense coating on the surface of the Li-rich transition metal oxide. Moreover, with the anhydride, when using a non-aqueous electrolyte, the entry of water into the non-aqueous electrolyte can be suppressed that may occur due to the dehydration condensation of the dicarboxylic acid.

In view of suppressing the solubility to the electrolyte low and forming a dense coating on the surface of the Li-rich transition metal oxide, the number of carbon atoms (including carbonyl carbon atoms) in the dicarboxylic acid/anhydride is preferably 3 to 6. Examples of the compound satisfying the above condition include malonic acid and maleic anhydride.

The Li-rich transition metal oxide can be used by mixing with another positive electrode active material capable of releasing lithium ions. An example of such another positive electrode active material is a composite oxide of lithium and a metal element $M^3$ represented by $Li_{x4}M^3O_2$, where $0.8 \leq x4 \leq 1.2$ (hereinafter, as appropriate, "third composite oxide"). $M^3$ includes at least one selected from the group consisting of Ni, Co, Mn, Cu, Fe and Cr. The third composite oxide belongs to the space group R-3m. The third composite exhibits relatively small expansion and contraction in its lattice during charge and discharge, and therefore, is unlikely to degrade even in the above electrolyte, which is effective in achieving excellent cycle characteristics.

The third composite oxide has a small irreversible capacity and is excellent in initial efficiency. By using the third composite oxide in combination with the Li-rich transition metal oxide, a positive electrode material which exhibits a high initial capacity and whose high capacity is maintained even after repeated charge-discharge cycles can be obtained.

In the case of containing the third composite oxide in the positive electrode material, the ratio of the Li-rich transition metal oxide to the total of the Li-rich transition metal oxide and the third composite oxide is preferably 0.3 to 20 mass %. When the Li-rich transition metal oxide is contained in the above range, the initial capacity of the positive electrode material as a whole can be increased, and the reduction in capacity due to repeated charge-discharge cycles can be suppressed.

When the positive electrode material according to the embodiment of the present disclosure is used to produce a secondary battery, for the negative electrode material, any conventional material used for lithium ion secondary batteries may be used.

Particularly preferred is a negative electrode active material including an alloy-type material containing at least one element selected from the group comprising Si, Sn, Ga, and In. Examples of the alloy-type material containing Si include silicon simple substance, a silicon alloy, and a silicon compound. Examples of the alloy-type material containing Sn include tin simple substance, a tin alloy, and a tin compound. Examples of the alloy-type material containing Ga or In include a Ga alloy and an In alloy. The silicon compound and the tin compound are each exemplified by an oxide and/or a nitride. Among the alloy-type materials containing Si, preferred are $SiO_x$, where $0.5 \leq x < 2.0$, and lithium silicate composite particles. Here, $SiO_x$ is composite particles in which monocrystalline silicon phases are dispersed in the $SiO_2$ phase. The lithium silicate composite particles are composite particles in which monocrystalline silicon is dispersed in the lithium silicate phase (e.g., $Li_{2x}SiO_{2+x}$, where $0 < x < 2$).

These alloy-type materials have a high capacity, whereas they are low in initial efficiency and contain a large number of lithium ions that are to be captured irreversibly during the initial charge and fail to contribute to the capacity in the later charge and discharge. However, when the positive electrode material includes the Li-rich transition metal oxide, the irreversible capacity of the negative electrode can be offset by the irreversible capacity of the positive electrode. In other words, the lithium ions consumed irreversibly at the negative electrode can be compensated for by the lithium ions emitted irreversibly from the Li-rich transition metal oxide. In this way, a secondary battery in which the reduction in capacity is suppressed in the charge-discharge cycles after the initial charge and discharge can be obtained.

The positive electrode material may partially have an amorphous structure mainly composed of $LiM^4O_2$, a transition metal oxide mainly composed of one selected from the group consisting of $LiFeO_2$, CoO, and MnO, and/or a transition metal oxide mainly composed of a composite of at least two selected from the group consisting of $LiFeO_2$, CoO, and MnO (hereinafter "amorphous etc. structure"). $M^4$ includes at least one selected from the group consisting of Ni, Co, Mn, Cu, and Fe. The amorphous etc. structure is a structure which lithium ions are difficult be absorbed into or released from, by charge and discharge. During the initial charge, when the lithium ions are desorbed from the Li-rich transition metal oxide, the Li-rich transition metal oxide can partially change to the amorphous etc. structure. The change can be accompanied by a side reaction, such as oxygen desorption. This is presumably one of the causes of the reduction in initial efficiency. On the other hand, in the case of including the dicarboxylic acid/anhydride in the positive electrode, the side reaction, such as oxygen desorption, facilitates the formation of a favorable coating with the dicarboxylic acid/anhydride, which can suppress the electrolyte decomposition and the gas generation.

The amorphous structure mainly composed of $LiM^4O_2$ refers to a state in which, for example, a half width w of a diffraction peak corresponding to the (101) plane of the Li-rich transition metal oxide obtained by X-ray diffractometry satisfies $w > 0.5°$. In view of enhancing the effect of the amorphous structure, such as suppressing electrolyte decomposition, $w > 1.5°$ is preferred.

Moreover, in the positive electrode active material including the Li-rich transition metal oxide and the third composite oxide, when a half width of a diffraction peak corresponding to the (101) plane of the Li-rich transition metal oxide obtained by X-ray diffractometry is 7 times or more as large as a half width of a highest intensity diffraction peak of the third composite oxide, the positive electrode material can be regarded as partially having an amorphous structure mainly composed of $LiM^4O_2$. In view of enhancing the effect of the amorphous structure, such as suppressing electrolyte decomposition, the aforementioned half width of the Li-rich transition metal oxide is preferably 10 times or more as large as the half width of the highest intensity diffraction peak of the third composite oxide.

In the present disclosure, the method of X-ray diffractometry and the data analysis conditions are, for example, as follows.

Measuring instrument: Desktop X-ray diffractometry instrument MiniFlex, available from Rigaku Corporation Analysis software: Integrated X-ray powder diffraction software PDXL, available from Rigaku Corporation Measuring conditions: 10° to 80°

Counter cathode: Cu-Kα

Tube voltage: 40 kV

Tube current: 10 mA

Count time: 0.5 seconds

Divergence slit: 1.25°

Scattering slit: 8.0 mm

Light receiving slit: 13.0 mm

Peaks used for analysis: A diffraction peak ($2\theta = 25$ to $26°$) corresponding to the (101) plane of the Li rich-transition metal oxide, and a highest intensity diffraction peak of the third composite oxide FIG. 1 is a schematic oblique view of a secondary battery according to one embodiment of the present disclosure. In FIG. 1, a secondary battery 1 is partially cut away, to show the configuration of the essential part thereof.

The secondary battery 1 includes a positive electrode, a negative electrode including a negative electrode material, and an electrolyte. The positive electrode includes a positive electrode material including the aforementioned Li-rich transition metal oxide.

In the illustrated example of FIG. 1, the positive electrode and the negative electrode are wound with a separator interposed therebetween, forming a flat wound electrode group 10. The electrode group 10 is housed together with the electrolyte (not shown) in a prismatic battery case 11, being completed as a prismatic wound battery. It is noted, however, in the present disclosure, the type, shape, and the like of the secondary battery is not particularly limited.

To a positive electrode current collector of the positive electrode included in the electrode group 10, one end of a positive electrode lead 14 is connected. The other end of the positive electrode lead 14 is connected to a sealing plate 12 serving as a positive electrode terminal. To a negative electrode current collector, one end of a negative electrode lead 15 is connected, and the other end of the negative electrode lead 15 is connected to a negative electrode terminal 13 provided approximately at the center of the sealing plate 12. Between the sealing plate 12 and the negative electrode terminal 13, a gasket 16 is placed, providing electrical insulation therebetween. Between the sealing plate 12 and the electrode group 10, a frame member 18 formed of an electrically insulating material is placed, providing electrical insulation between the negative electrode lead 15 and the sealing plate 12. The sealing plate 12 is attached to the battery case 11 at its open end, sealing the prismatic battery case 11. The sealing plate 12 is provided with an injection hole 17*a*. The electrolyte is injected through the injection hole 17*a* into the prismatic battery case 11. Thereafter, the injection hole 17*a* is closed with a sealing stopper 17.

(Positive Electrode)

The positive electrode includes a positive electrode current collector and a positive electrode material layer (positive electrode material) provided on a surface of the positive electrode current collector. The positive electrode current collector is in the form of sheet. The positive electrode material layer includes a positive electrode active material. The positive electrode material layer may be formed on one surface or both surfaces of the sheet-form positive electrode current collector.

(Positive Electrode Current Collector)

The positive electrode current collector is in the form of, for example, metal foil or metal sheet. The positive electrode current collector may be made of, for example, stainless steel, aluminum, an aluminum alloy, or titanium. The thickness of the positive electrode current collector can be selected from the range of, for example, 3 to 50 μm, (Positive Electrode Material Layer)

A description will be given below of a case where the positive electrode material layer comprises a mixture (positive electrode mixture) including positive electrode active material particles. The positive electrode material layer essentially contains a positive electrode active material, the dicarboxylic acid/anhydride, and a binder, and may optionally contain an electrically conductive material. The binder is contained in the positive electrode material layer in an amount of preferably 0.1 to 20 parts by mass, more preferably 1 to 5 parts by mass, relative to 100 parts by mass of the positive electrode active material. The positive electrode material layer has a thickness of, for example, 10 to 100 μm.

The positive electrode active material includes the aforementioned Li-rich transition metal oxide. The Li-rich transition metal oxide may be used in combination with another known positive electrode material having a function of absorbing and releasing lithium ions. A preferable example of such a positive electrode material is, but not limited to, a lithium-containing transition metal oxide. Examples of the transition metal element include Sc, Y, Mn, Fe, Co, Ni, Cu, Cr, Zr, and W. Preferred among them are Ni, Co, Mn, Fe, Cu, and Cr, and more preferred are Mn, Co, and Ni. The lithium-containing transition metal oxide is preferably a lithium-nickel composite oxide containing Li, Ni, and one or more other metals, in terms of achieving a high capacity.

The lithium-containing transition metal oxide may contain, if necessary, one kind or two or more kinds of typical metal elements. Examples of the typical metal elements include Mg, Al, Ca, Zn, Ga, Ge, Sn, Sb, Pb, and Bi. The typical metal element is preferably Al or the like.

The lithium-containing transition metal oxide used in combination with the Li-rich transition metal oxide is, for example, the aforementioned third composite oxide $Li_aM^3O_2$ belonging to the space group R-3m, where $M^3$ includes at least one selected from the group consisting of Ni, Co, Mn, Cu, Fe, and Cr, and $0.8 \leq a \leq 1.2$.

The third composite oxide may contain, for example, Ni, Co, and Mn and/or Al. In such a positive electrode active material, the content of Ni in the total of Ni, Co, Mn, and Al may be 50 atom % or more. For example, when the positive electrode active material contains Ni, Co, and Al, the content of Ni may be 50 atom % or more, and may be 80 atom % or more. When the positive electrode active material contains Ni, Co, and Mn, the content of Ni may be 50 atom % or more.

Examples of the lithium-containing transition metal oxide (third composite oxide) include a lithium-nickel-cobalt-manganese composite oxide (e.g., $LiNi_{0.5}Co_{0.2}Mn_{0.3}O_2$, $LiN_{1/3}Co_{1/3}Mn_{1/3}O_2$, $LiNi_{0.4}Co_{0.2}Mn_{0.4}O_2$), a lithium-nickel-cobalt composite oxide (e.g., $LiNi_{0.8}Co_{0.2}O_2$), and a lithium-nickel-cobalt-aluminum composite oxide (e.g., $LiNi_{0.8}Co_{0.15}Al_{0.05}O_2$, $LiNi_{0.8}Co_{0.18}Al_{0.02}O_2$, $LiNi_{0.88}Co_{0.09}Al_{0.03}O_2$).

When the positive electrode active material includes the Li-rich transition metal oxide and the third composite oxide, the ratio of the Li-rich transition metal oxide to the total of the Li-rich transition metal oxide and the third composite oxide is preferably 0.3 to 20 mass %.

In view of enhancing the packability of the positive electrode active material in the positive electrode material layer, the positive electrode active material particles desirably have an average particle diameter (D50) which is small enough with respect to the thickness of the positive electrode material layer. The average particle diameter (D50) of the positive electrode active material particles is, for example, preferably 5 to 30 μm, more preferably 10 to 25 μm. The average particle diameter (D50) herein means a median diameter at 50% cumulative volume in a volumetric particle size distribution. The average particle diameter can be measured by, for example, using a laser diffraction/scattering type particle size distribution analyzer.

The positive electrode material layer contains the dicarboxylic acid/anhydride. The dicarboxylic acid/anhydride can coat at least part of the surface of the positive electrode active material particles. As a result, the surface of the positive electrode active material particles can be at least partially covered with a coating containing lithium, oxygen, and carbon. Furthermore, the coating can coat at least part of the surface of the binder and at least part of the surface of the conductive material.

The dicarboxylic acid/anhydride is contained preferably in a proportion of 0.1 to 10 mass % in the positive electrode material layer (positive electrode material) as a whole. When the positive electrode material includes 0.1 mass % or more of the dicarboxylic acid/anhydride, the coating can be formed on the surface of the positive electrode active material particles, which can suppress the decomposition of electrolyte. On the other hand, with increasing the proportion of the dicarboxylic acid/anhydride, the proportion of the positive electrode active material decreases, which lowers the capacity. Moreover, the thickness of the coating increases. A thick coating inhibits the release of lithium ions, which increases the resistance and tends to lower the capacity.

When the positive electrode material includes the dicarboxylic acid/anhydride in a proportion of 10 mass % or less, a high capacity can be maintained.

Examples of the binder include: fluorocarbon resin, such as polyvinylidene fluoride (PVdF), polytetrafluoroethylene (PTFE), and tetrafluoroethylene-hexafluoropropylene (HFP) copolymer; acrylic resin, such as polymethyl acrylate and ethylene-methyl methacrylate copolymer; rubbery materials, such as styrene-butadiene rubber (SBR) and acrylic rubber; and water-soluble polymers, such as carboxymethyl cellulose (CMC) and polyvinylpyrrolidone.

The conductive material is preferably a carbon black, such as acetylene black or Ketjen black.

The positive electrode material layer can by formed by mixing positive electrode active material particles, a dicarboxylic acid and/or an anhydride of the dicarboxylic acid, a binder, and the like with a dispersion medium, to prepare a positive electrode slurry, applying the positive electrode slurry onto a surface of a positive electrode current collector, drying the slurry, and then rolling. Examples of the dispersion medium include water, alcohols such as ethanol, ethers such as tetrahydrofuran, and N-methyl-2-pyrrolidone (NMP).

When the positive electrode active material includes the Li-rich transition metal oxide, the alkalinity of the positive electrode slurry tends to increase. Under the strong alkali condition, the PVdF derived from the binder tends to react to produce hydrogen fluoride (HF). The hydrogen fluoride thus produced is likely to degrade the positive electrode. However, by containing the dicarboxylic acid in the positive electrode slurry, the alkalinity of the positive electrode slurry can be weakened, and the reaction of PVdF can be suppressed.

(Negative Electrode)

The negative electrode includes a negative electrode current collector. The negative electrode current collector is in the form of sheet. The negative electrode may further include a negative electrode material layer (negative electrode material) provided on a surface of the negative electrode current collector. The negative electrode material layer includes a negative electrode active material capable of absorbing and desorbing lithium. The negative electrode material layer may be formed on one surface or both surfaces of the negative electrode current collector.

In the secondary battery according to the embodiment of the present disclosure, a high positive-electrode capacity can be achieved, and therefore, at the negative electrode, the negative electrode active material capable of absorbing lithium ions tends to be in short supply against the lithium ions released at the positive electrode. Specifically, for example, the secondary battery may be such that, at a 4.3 V charged state, metal lithium deposits on the negative electrode (negative electrode current collector and/or negative electrode active material), (Negative Electrode Current Collector)

Examples of the negative electrode current collector include a metal foil, a metal sheet, a mesh metal, a punched sheet metal, and an expanded metal. The negative electrode current collector may be made of, for example, stainless steel, nickel, copper, or a copper alloy. The thickness of the negative electrode current collector can be selected from the range of, for example, 3 to 50 μm.

(Negative Electrode Material Layer)

The negative electrode material layer can be formed in a similarly manner to the positive electrode material layer, using a negative electrode slurry including a negative electrode active material, a binder, and a dispersion medium. The negative electrode material layer may contain, if necessary, an optional component, such as an electrically conductive material. The amount of the binder contained in the negative electrode material layer is preferably 0.1 to 20 parts by mass, more preferably 1 to 5 parts by mass, relative to 100 parts by mass of the negative electrode material layer. The negative electrode material layer has a thickness of, for example, 10 to 100 μm.

The negative electrode active material may be either a non-carbonaceous material or a carbon material, or a combination of them. The carbon material used as the negative electrode active material is not particularly limited, but is preferably, for example, at least one selected from the group consisting of graphite and hard carbon. Among them, graphite is more preferred because of its high capacity and small irreversible capacity.

Graphite is the collective name for carbon materials having a graphite structure and includes natural graphite, artificial graphite, expandable graphite, and graphitized mesophase carbon particles. Examples of the natural graphite include flake graphite and amorphous graphite. Usually, a carbon material having an interplanar spacing $d_{002}$ of the (002) plane of the graphite structure of 3.35 to 3.44 angstrom calculated from its X-ray diffraction spectrum is classified as graphite. On the other hand, hard carbon is a carbon material in which tiny graphite crystals are arranged in random directions, and further graphitization hardly proceeds, and which has an interplanar spacing $d_{002}$ of the (002) plane of greater than 3.44 angstrom.

The non-carbonaceous material used as the negative electrode active material is preferably an alloy-type material. The alloy-type material preferably contains at least one selected from silicon, tin, Ga, and In, and is preferably silicon simple substance or a silicon compound. The silicon compound encompasses a silicon oxide and a silicon alloy.

The negative electrode active material may be metal lithium or a lithium alloy.

(Separator)

The separator may be, for example, a microporous film, nonwoven fabric, or woven fabric made of a resin. Examples of the resin include polyolefins, such as polyethylene (PE) and polypropylene (PP), polyamides, and polyamide-imides.

(Electrolyte)

The electrolyte includes a solvent and a solute dissolved in the solvent. The solute may be selected from various lithium salts. The lithium salt concentration in the electrolyte is, for example, 0.5 to 2 mol/L. The electrolyte may contain one or more known additives.

The solvent may be, for example, a non-aqueous solvent, such as cyclic carbonic ester, chain carbonic ester, cyclic carboxylic acid ester, or chain carboxylic acid ester, or water.

Examples of the cyclic carbonic ester include ethylene carbonate (EC), fluoroethylene carbonate (FEC), propylene carbonate (PC), butylene carbonate, vinylene carbonate, vinyl ethylene carbonate, and derivatives thereof. These may be used singly or in combination of two or more kinds. In view of the ion conductivity of the electrolyte liquid, preferred is at least one selected from the group consisting of ethylene carbonate, fluoroethylene carbonate, and propylene carbonate.

Examples of the chain carbonic ester include diethyl carbonate (DEC), ethyl methyl carbonate (EMC), and dimethyl carbonate (DMC).

Examples of the cyclic carboxylic acid ester include γ-butyrolactone (GBL) and γ-valerolactone (GVL).

Examples of the chain carboxylic acid ester include methyl acetate (MA), ethyl acetate (EA), propyl acetate, methyl propionate, ethyl propionate, and propyl propionate.

These solvents may be used singly or in combination of two or more kinds.

Examples of the lithium salt include: $LiPF_6$, $LiBF_4$, $LiClO_4$, $LiAsF_6$, $LiCF_3SO_3$, $LiN(SO_2F)_2$, and $LiN(SO_2CF_3)_2$. These lithium salts may be used singly or in combination of two or more kinds.

EXAMPLES

The present disclosure will be specifically described below with reference to Examples and Comparative Examples. It is to be noted, however, that the present disclosure is not limited to the following Examples.

Example 1

A secondary battery was produced by the following procedures, with $Li_5FeO_4$ used as the positive electrode active material.

(1) Production of Positive Electrode

The Li-rich transition metal oxide used here was $Li_5FeO_4$ being the second composite oxide. The third composite oxide used here was $LiCoO_2$. The dicarbon carboxylic acid used here was malonic acid (MAL).

$Li_5FeO_4$, $LiCoO_2$, MAL, acetylene black (AB) serving as an electrically conductive material, and polyvinylidene fluoride (PVdF) serving as a binder were mixed in a mass ratio of $Li_5FeO_4$:$LiCoO_2$:MAL:AB:PVdF=4:93.1:1:1:0.9, to which N-methyl-2-pyrrolidone (NMP) was further added in an adequate amount and stirred, to prepare a positive electrode slurry. Next, the obtained positive electrode slurry was applied onto one surface of an aluminum foil (positive electrode current collector) and then dried. The dry applied film to serve as a positive electrode mixture layer was rolled between rollers.

A stack of the positive electrode current collector and the positive electrode mixture layer was cut in an electrode size, to form a positive electrode including the positive electrode current collector with the positive electrode material layer formed on one surface thereof.

(2) Production of Negative Electrode

Artificial graphite serving as a negative electrode active material, a sodium salt of carboxymethyl cellulose serving as a thickener, and a styrene-butadiene copolymer serving as a binder were mixed in a mass ratio of 100:1:1, to prepare a negative electrode slurry. The obtained negative electrode slurry was applied onto one surface of a negative electrode current collector formed of a copper foil. The applied film was dried, and then, the dry applied film to serve as a negative electrode mixture layer was rolled between rollers. A stack of the negative electrode current collector and the negative electrode mixture layer was cut in an electrode size, to form a negative electrode including the negative electrode current collector with the negative electrode material layer formed on one surface thereof.

(3) Preparation of Electrolyte

To 100 parts by mass of a mixture containing EC and EMC in a mass ratio of 1:3, 1 part by mass of vinylene carbonate was added, to give a non-aqueous solvent. $LiPF_6$ was dissolved in the non-aqueous solvent at a concentration 1.0 mol/L, to prepare an electrolyte.

(4) Fabrication of Battery

The positive electrode and the negative electrode obtained above were each attached with a lead wire. The positive electrode and the negative electrode were faced with each other, with a 0.015-mm-thick separator containing PP and PE interposed therebetween, to form an electrode body. The electrode body was enclosed, together with the electrolyte, in an outer case made of an aluminum laminated film. A secondary battery A1 was thus fabricated.

(5) Evaluation

Charging was performed at a constant current of 0.05 C until the closed-circuit voltage of the battery reached 4.35 V, and subsequent charging was performed at a constant voltage of 4.35 V until the current value became less than 0.02 C, to determine an initial charge capacity $C_1$ of the battery.

Thereafter, discharging was performed at a constant current of 0.05 C until the closed-circuit voltage of the battery reached 2.5 V, to determine a discharge capacity $C_2$. The evaluation was made, with $X=C_2/C_1$; taken as the initial efficiency. Here, the charging and the discharging were performed in a 25° C. environment.

Example 2

In the production of the positive electrode, the positive electrode slurry was prepared by mixing $Li_5FeO_4$:$LiCoO_2$:MAL:AB:PVdF=4:89.1:5:1:0.9 by mass.

A secondary battery A2 was produced in the same manner as in Example 1, except the above.

Comparative Example 1

In the production of the positive electrode, the positive electrode slurry not including malonic acid was used.

A secondary battery B1 was produced in the same manner as in Example 1, except that the positive electrode slurry was prepared by mixing $Li_5FeO_4$:$LiCoO_2$:AB:PVdF=4:94.1:1:0.9 by mass.

Regarding Examples 1 and 2 and Comparative Example 1, the evaluation results of the initial charge capacity $C_1$ and the initial efficiency X are shown in Table 1. In Table 1, the initial efficiency X represents a relative value, with the initial efficiency of the battery B1 taken as 100.

Reference Example 1

In the production of the positive electrode, the positive electrode slurry including neither the Li-rich transition metal oxide nor malonic acid was used.

$LiCoO_2$ being the third composite oxide, acetylene black (AB) serving as an electrically conductive material, and polyvinylidene fluoride (PVdF) serving as a binder were mixed in a mass ratio of $LiCoO_2$:AB:PVdF=98.1:1:0.9, to which N-methyl-2-pyrrolidone (NMP) was further added in an adequate amount and stirred, to prepare a positive electrode slurry. A secondary battery C1 was produced in the same manner as in Example 1, except the above.

Reference Example 2

In Reference Example 1, the positive electrode slurry including malonic acid was used.

Specifically, $LiCoO_2$, MAL, acetylene black (AB) serving as an electrically conductive material, and polyvinylidene fluoride (PVdF) serving as a binder were mixed in a mass ratio of $LiCoO_2$:MAL:AB:PVdF=97.1:1:1:0.9, to which N-methyl-2-pyrrolidone (NMP) was further added in an adequate amount and stirred, to prepare a positive electrode slurry. A secondary battery C2 was produced in the same manner as in Example 1, except the above.

Reference Examples 1 and 2 were evaluated for the initial charge capacity Ct in the similar was as above. The results are shown in Table 1.

Example 3

A secondary battery was produced as follows, using $Li_2NiO_2$ as the positive electrode active material.

(1) Production of Positive Electrode

The Li-rich transition metal oxide used here was $Li_2NiO_2$ being the first composite oxide. The third composite oxide used here was $LiNi_{0.82}Co_{0.15}Al_{0.03}O_2$. The dicarbon carboxylic acid used here was maleic anhydride (MALE).

$Li_2NiO_2$, $LiNi_{0.82}Co_{0.15}Al_{0.03}O_2$, MALE, acetylene black (AB) serving as an electrically conductive material, and polyvinylidene fluoride (PVdF) serving as a binder were mixed in a mass ratio of $Li_2NiO_2$:$LiNi_{0.82}Co_{0.15}Al_{0.03}O_2$:MALE:AB:PVdF=20:80:1:1:0.9, to which N-methyl-2-pyrrolidone (NMP) was further added in an adequate amount and stirred, to prepare a positive electrode slurry. Next, the obtained positive electrode slurry was applied onto one surface of an aluminum foil (positive electrode current collector) and then dried. The dry applied film to serve as a positive electrode mixture layer was rolled between rollers. A stack of the positive electrode current collector and the positive electrode mixture layer was cut in an electrode size, to form a positive electrode including the positive electrode current collector with the positive electrode material layer formed on one surface thereof.

A secondary battery A3 was produced in the same manner as the battery A1 of Example 1 was produced, except the above.

(2) Evaluation

Charging was performed at a constant current of 0.05 C until the closed-circuit voltage of the battery reached 4.2 V, and subsequent charging was performed at a constant voltage of 4.2 V until the current value reached below 0.02 C, to determine an initial charge capacity C; of the battery.

Thereafter, discharging was performed at a constant current of 0.05° C. until the closed-circuit voltage of the battery reached 2.5 V, to determine a discharge capacity C; The evaluation was made, with $X=C_2/C_1$ taken as the initial efficiency. Here, the charging and the discharging were performed in a 25° C. environment.

Comparative Example 2

A secondary battery B2 was produced in the same manner as in Example 3, except that in the production of the positive electrode, the positive electrode slurry not including maleic anhydride was used.

Regarding Example 3 and Comparative Example 2, the evaluation results of the initial charge capacity $C_1$ and the initial efficiency X are shown in Table 2. In Table 2, the initial efficiency X represents a relative value, with the initial efficiency of the battery B2 taken as 100.

TABLE 1

| Cell | Initial charge capacity $C_1$ (mAh/g) | Initial efficiency X |
|---|---|---|
| A1 | 195.2 | 100.03 |
| A2 | 191.8 | 101.7 |
| B1 | 186.2 | 100 |
| C1 | 194.3 | — |
| C2 | 191.0 | — |

TABLE 2

| Cell | Initial charge capacity $C_1$ (mAh/g) | Initial efficiency X |
|---|---|---|
| A3 | 250.5 | 100.6 |
| B2 | 241.3 | 100 |

Table 1 shows that in the batteries A1 and A2 fabricated using the positive electrode slurry including the Li-rich transition metal oxide and the dicarboxylic acid, the initial charge capacity $C_1$ was high, and the initial efficiency X was improved, as compared to in the battery B1 fabricated using the positive electrode slurry including the Li-rich transition metal oxide but not including the dicarboxylic acid.

Table 2 shows that in the battery A3 fabricated using the positive electrode slurry including the Li-rich transition metal oxide and an anhydride of the dicarboxylic acid, the initial charge capacity $C_1$ was high, and the initial efficiency X was improved, as compared to in the battery B2 fabricated using the positive electrode slurry including the Li-rich transition metal oxide but not including an anhydride of the dicarboxylic acid.

In the battery A2, as compared to in the battery A1, the initial charge capacity was low. This is presumably because the amount of malonic acid added in the battery A2 was larger than that in the battery A1, and the coating derived from the dicarboxylic acid was formed thickly on the positive electrode material surface, which inhibited the release of lithium ions. On the other hand, due to the thick coating, the initial capacity of the battery A2 was improved, as compared to that of the battery A1.

In the battery A2, the reduction in initial charge capacity was partially compensated for by the improved initial efficiency. Consequently, the capacity after the first charge and discharge was maintained high as in the battery A1.

The comparison between the batteries C1 and C2 both fabricated using the positive electrode slurry not including the Li-rich transition metal oxide shows that the addition of the dicarboxylic acid resulted in the initial charge capacity Ca being lower in the battery C2 than in the battery C1. This indicates that the improvement in the initial charge capacity by the addition of the dicarboxylic acid/anhydride to the positive electrode material can be achieved when the Li-rich transition metal oxide is used as the positive electrode active material.

The secondary batteries A1 and A2 were disassembled after charge and discharge, to take out the positive electrode active material from each battery. The positive electrode active material was subjected to X-ray diffractometry, from which a diffraction pattern corresponding to a mixture of the Li-rich transition metal oxide and the third composite oxide was obtained. The half width of the diffraction peak corresponding to the (101) plane of the Li-rich transition metal oxide was, 12.6 times in A1, and 10.9 times in A2, as large as the half width of the highest intensity diffraction peak of the third composite oxide.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The positive electrode according to the present disclosure is useful as a positive electrode for secondary batteries used as a driving power source for electronic devices, such as personal computers, cellular phones, mobile devices, personal digital assistants (PDA), portable game machines, and camcorders, a main or auxiliary driving power source for an electric motor in vehicles, such as hybrid electric cars and plug-in HEVs, and a driving power source for electric power tools, vacuum cleaners, robots, and the like.

REFERENCE SIGNS LIST

1: secondary battery, 10; wound electrode group, II: prismatic battery case, 12: sealing plate, 13: negative electrode terminal, 14: positive electrode lead, 15: negative electrode lead, 16: gasket, 17: sealing stopper, 17*a*: injection hole, 18: frame member

The invention claimed is:

1. A positive electrode material for secondary batteries, the positive electrode material comprising:

a Li-rich transition metal oxide having a lithium-to-oxygen atomic ratio: Li/O of 0.8 or more; and a dicarboxylic acid and/or an anhydride of the dicarboxylic acid, wherein the anhydride of the dicarboxylic acid has 3 to 6 carbonyl carbon atoms, wherein the positive electrode material has a surface at least partially covered with a coating containing lithium, oxygen, and carbon, and wherein the positive electrode material further comprises a binder including polyvinylidene fluoride (PVdF).

2. The positive electrode material according to claim 1, wherein the Li-rich transition metal oxide is a first composite oxide represented by a general formula (1): $Li_{x1}M^1A^1_2$, where $1.5 \le x1 \le 2.3$, and belonging to a space group Immm, $M^1$ including at least one selected from the group consisting of Ni, Co, Mn, Cu, and Fe, $A^1$ including at least oxygen, $A^1$ having an oxygen content of 85 atom % or more.

3. The positive electrode material according to claim 2, wherein the first composite oxide is represented by a general formula (1a): $Li_{x1}M^{1A}_{1-x2}M^{1B}_{x2}O_{2-y}A^2_y$, where $0 \le x2 \le 0.5$, $0 \le y \le 0.3$, and at least one of x2 and y not being 0, $M^{1A}$ being at least one selected from the group consisting of Ni, Co, Mn, Cu, and Fe, $M^{1B}$ including at least one selected from the group consisting of Al, Mg, Sc, Ti, Cr, V, Zn, Ga, Zr, Mo, Nb, Ta, and W, $A^2$ including at least one selected from the group consisting of F, Cl, Br, S, and P.

4. The positive electrode material according to claim 1, wherein the Li-rich transition metal oxide is a second composite oxide represented by a general formula (2): $Li_{x3}M^2O_z$, where $4 \le x3 \le 7$ and $3.5 \le z \le 5$, and belonging to a space group Pbca, $M^2$ including at least one selected from the group consisting of Ni, Co, Mn, Cu, and Fe.

5. The positive electrode material according to claim 1, further comprising a third composite oxide belonging to a space group R-3m, wherein the third composite oxide is represented by a general formula: $Li_{x4}M^3O_2$, where $0.8 \le x4 \le 1.2$, $M^3$ including at least one selected from the group consisting of Co, Mn, Cu, Fe, and Cr.

6. The positive electrode material according to claim 5, wherein a ratio of the Li-rich transition metal oxide to a total of the Li-rich transition metal oxide and the third composite oxide is 0.3 to 20 mass %.

7. The positive electrode material according to claim 5, wherein a half width w of a diffraction peak corresponding to the (101) plane of the Li-rich transition metal oxide is 10 times or more as large as a half width of a highest intensity diffraction peak of the third composite oxide.

8. The positive electrode material according to claim 1, wherein the dicarboxylic acid has 3 to 6 carbon atoms.

9. The positive electrode material according to claim 8, wherein the dicarboxylic acid includes malonic acid.

10. The positive electrode material according to claim 1, wherein the anhydride of the dicarboxylic acid further includes a maleic anhydride, glutaric anhydride, and/or succinic anhydride.

11. A secondary battery, comprising:

a positive electrode; a negative electrode; and an electrolyte, the positive electrode having a positive electrode material layer, the positive electrode material layer including the positive electrode material according to claim 1.

12. The secondary battery according to claim 11, wherein the dicarboxylic acid and/or the anhydride of the dicarboxylic acid is contained in a proportion of 0.1 to 10 mass % in the positive electrode material layer.

13. The secondary battery according to claim 11, wherein the negative electrode includes a negative electrode active material, the negative electrode active material includes an alloy-based material, and the alloy-based material contains at least one element selected from the group consisting of Si, Sn, Ga, and In.

14. The secondary battery according to claim 11, wherein the positive electrode material partially has an amorphous structure mainly composed of $LiM^4O_2$, a transition metal oxide mainly composed of one selected from the group consisting of $LiFeO_2$, CoO and MnO, and/or a transition metal oxide mainly composed of a composite of at least two selected from the group consisting of $LiFeO_2$, CoO, and MnO, $M^4$ including at least one selected from the group consisting of Ni, Co, Mn, Cu and Fe.

15. The secondary battery according to claim 11, wherein, at a 4.3 V charged state, metal lithium is deposited on the negative electrode.

16. The secondary battery according to claim 11, wherein the positive electrode material has a surface at least partially covered with a coating containing lithium, oxygen, and carbon.

17. A positive electrode material for secondary batteries, the positive electrode material comprising:

a Li-rich transition metal oxide having a lithium-to-oxygen atomic ratio: Li/O of 0.8 or more; and a dicarboxylic acid and/or an anhydride of the dicarboxylic acid, wherein the positive electrode material is a positive electrode active material powder, a positive electrode material mixture, a slurry of a positive electrode material mixture, or a positive electrode material layer, which is free of an electrolyte, wherein the positive electrode material partially has an amorphous structure mainly composed of $LiM^4O_2$, a transition metal oxide mainly composed of one selected from the group consisting of $LiFeO_2$, CoO and MnO, and/or a transition metal oxide mainly composed of a composite of at least two selected from the group consisting of $LiFeO_2$, CoO, and MnO, $M^4$ including at least one selected from the group consisting of Ni, Co, Mn, Cu and Fe, wherein the positive electrode material has a surface at least partially covered with a coating containing lithium, oxygen, and carbon, and wherein the positive electrode material further comprises a binder including polyvinylidene fluoride (PVdF).

18. The positive electrode material according to claim 17, wherein a half width w of a diffraction peak corresponding to the (101) plane of the Li-rich transition metal oxide obtained by X-ray diffractometry satisfies w>1.5°.

19. A positive electrode material for secondary batteries, the positive electrode material comprising:

a Li-rich transition metal oxide having a lithium-to-oxygen atomic ratio: Li/O of 0.8 or more; and a dicarboxylic acid and/or an anhydride of the dicarboxylic acid, wherein the positive electrode material is a positive electrode active material powder, a positive electrode material mixture, a slurry of a positive electrode material mixture, or a positive electrode material layer, which is free of an electrolyte, wherein the positive electrode material has a surface at least partially covered with a coating containing lithium, oxygen, and carbon, and wherein the positive electrode material further comprises a binder including polyvinylidene fluoride (PVdF).

* * * * *